Figure 1:
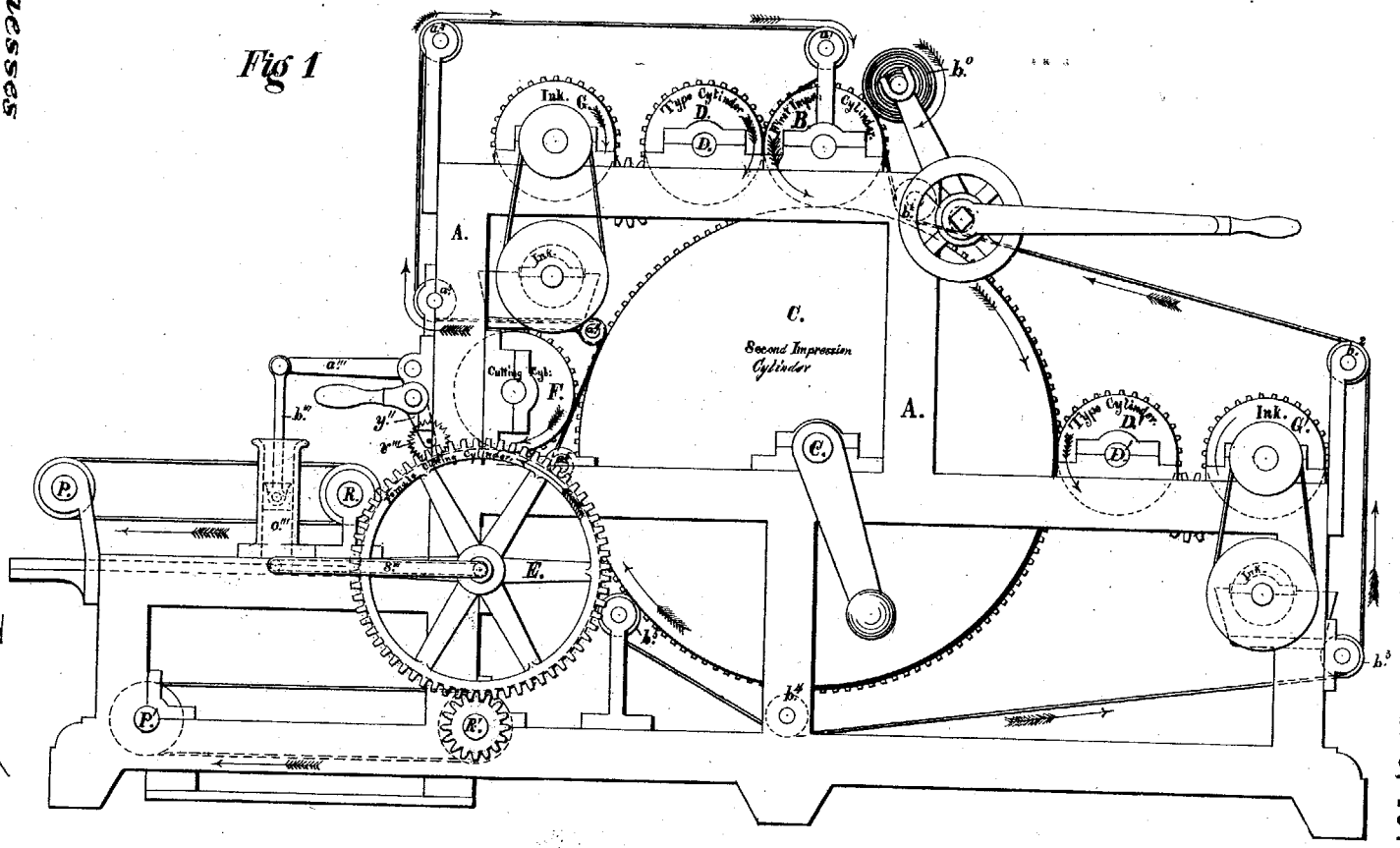

2 Sheets—Sheet 1.

J. W. KELLBERG.

PRINTING-PRESS.

No. 6,901. Reissued Feb. 8, 1876.

Witnesses
Stanley Williams
Alex M. Stout

Inventor:
John W. Kellberg
by A. M. Stone
his atty in fact

N. PETERS, PHOTO-LITHOGRAPHER, WASHINGTON, D. C.

2 Sheets—Sheet 2.
J. W. KELLBERG.
PRINTING-PRESS.
No. 6,901.
Reissued Feb. 8. 1876.
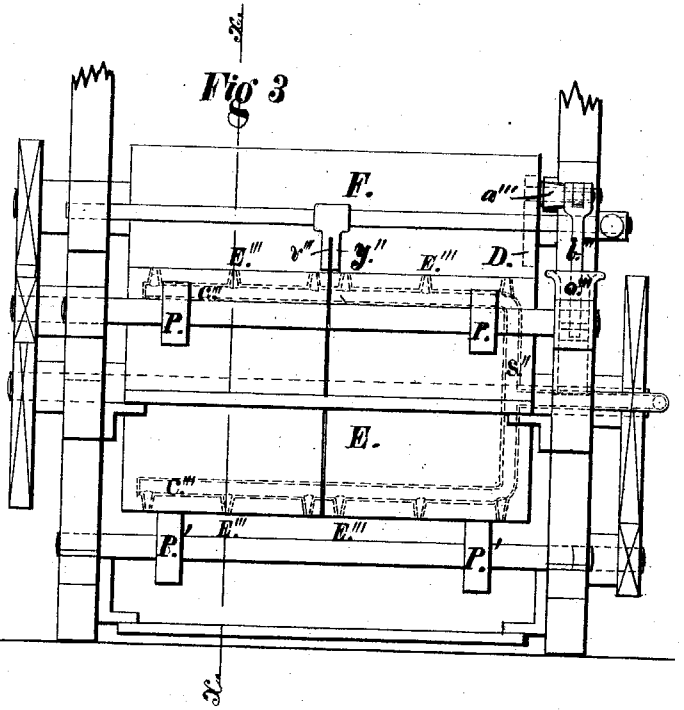
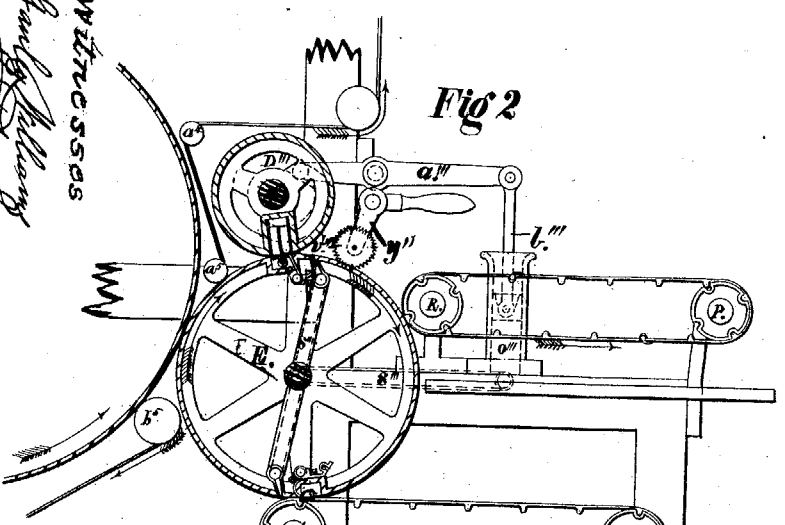
Witnesses
Stanley Williams
Alex M. Fort
Inventor.
John W. Kellberg
by A. M. Stone
his atty in fact.
N. PETERS, PHOTO-LITHOGRAPHER, WASHINGTON, D. C.

UNITED STATES PATENT OFFICE.

JOHN W. KELLBERG, OF PHILADELPHIA, PENNSYLVANIA, ASSIGNOR, BY MESNE ASSIGNMENTS, OF ONE-HALF INTEREST TO THE BULLOCK PRINTING-PRESS COMPANY, OF SAME PLACE.

IMPROVEMENT IN PRINTING-PRESSES.

Specification forming part of Letters Patent No. 110,244, dated December 20, 1870; reissue No. 6,901, dated February 8, 1876; application filed July 10, 1873.

*To all whom it may concern:*

Be it known that I, JOHN W. KELLBERG, of Philadelphia, in the county of Philadelphia and State of Pennsylvania, have invented certain Improvements in Rotary Power Printing-Machines, of which the following is a specification:

I will here premise, generally, that my improvement relates to that class of such machines which print both sides of the paper, sever the sheet from the continuous roll, and split it in one operation.

My invention relates, first, to such a combination and arrangement of the impression, type, and cutting cylinders that the paper, after being fed from the roll, shall be successively and continuously in contact with their convex surfaces until it shall be printed on both sides, severed from the roll, and split, ready for the delivery apparatus, without the use of carrying-tapes, belts, gripers, or bridges, as hereinafter more fully described.

My invention relates, secondly, to a combination of two sets of pulleys, with their respective endless bands traveling over them, and the first impression, type, and cutting cylinders, arranged as and for the purpose specified above.

My invention relates, thirdly, to a combination of the spool or paper roll, mounted in rolling contact with the first impression-cylinder, in order to feed the machine, as will be more fully explained hereinafter.

My invention relates, fourthly, to a combination of an air-blast with the female cutting-cylinder, in such a manner as to remove, by air-currents, the rear end of the severed sheet out of the way of the gripers on that cylinder, so that they may be free to seize the forward end of the roll.

My invention relates, fifthly, to the combination and arrangement of two delivery apparatus in such a manner that each shall receive and deliver a sheet alternately, and one shall move at a greater rate of speed than the other, for the purpose more fully described hereinafter.

My invention relates, sixthly, to the mounting and operating a serrated slitting-knife in such a manner that the paper itself shall give it motion, and it shall split the paper.

In the accompanying drawings, Figure 1 represents a side elevation of the machine, the front end being to the right and the rear to the left; Fig. 2, a longitudinal vertical section, taken as indicated by the broken line *x x* in Fig. 3; and Fig. 3, a front or delivery end elevation of the same.

A is the frame of the machine, composed of parallel side and cross pieces and uprights, supporting the various shafts and cylinders, which are mounted in horizontal positions parallel to each other. C is the second impression-cylinder, through which the power applied drives the whole machine, its diameter being a multiple of the first impression-cylinder B, type-cylinders D and D′, and the male cutting-cylinder F; and G and G′ are the ink-distributers. E is the female cutting-cylinder, and its diameter is equal to two diameters of the male cutting-cylinder F. R P is the upper delivery apparatus, for receiving alternate sheets from the female cutting-cylinder E and depositing them on the pile; and R′ P′, the lower delivery apparatus, for receiving the other alternate sheets from the same cutting-cylinder and depositing them on another pile. $o'''$ is a cylinder of an air-pump; $b'''$, the piston, and $a'''$ the arm by which the same is operated. D‴ (shown in dotted outline in Fig. 2) is the cam-formed groove, in which a crank-pin on the arm $a'''$ works and reciprocates the piston $b'''$, and thus forces the air through pipes S″ into pipes S‴ and C‴, and out through nozzles E‴ E‴′ E‴, which are arranged in two lines, on opposite sides, in the interior of the female cutting-cylinder E, as shown in outline by broken lines in Fig. 3, the cylinder having openings corresponding to those of the nozzle.

The female cutting-cylinder E should have one or more grooves, according to the exigencies of the case, running around its periphery, for the slitting-instrument $v'''$, which is a circular serrated knife mounted in the arm $y''$ on a shaft, as shown.

$b^1$, $b^2$, $b^3$, $b^4$, and $b^5$ are pulleys carrying the endless tapes on the outside of the first impression-cylinder B, and between the paper and the second impression-cylinder C, which cords or tapes, in combination with endless tapes on pulleys $a^1$, $a^2$, $a^3$, $a^4$, and $a^5$, carry the paper to the female cutting-cylinder E. Pulley $b^0$ is the spool and roll of paper to be printed, cut into sheets and slitted.

The mode of operation may be simply described thus: When the cylinder C is set in motion, the forward end of the paper, which rests upon the first impression-cylinder B, is inserted between the two series of tapes, when such tapes are used, running on pulleys $a^1$ and $b^1$, and then, being carried between the first type and the first impression cylinders, it receives its first impression, and is printed on one side; then it is carried between the two series of tapes forward and around the second impression-cylinder, printing it on the other side, between the second impression-cylinder C and the second type-cylinder D′, from whence it is still carried on around the second impression-cylinder, between the said two series of tapes, to the female cutting-cylinder E, the circumference of which, being equal to the length of two sheets of paper to be cut, is provided with two sets of gripers, which are directly opposite each other, and so constructed, arranged, and operated as to seize the forward end of the web immediately after the severance of a sheet from it; but as the rear end of the preceding sheet would then be over the openings through which the gripers seizing the forward end of the roll, as aforesaid, must pass, the cam operates the arm $a'''$, attached to the air-pump $o'''$, and drives the air out of the apertures in the cutting-cylinder E made for that purpose, and designated E‴ E‴ E‴, thereby removing or blowing the rear end of the cut sheet on the cylinder E out of the way or reach of the gripers in seizing the forward end of the roll of paper. The forward end of the roll is then seized and retained by the gripers on the female cutting-cylinder E until it reaches the delivery apparatus R P, when the gripers on the cylinder E are made to let go their hold of the paper and resume their position ready for the next sheet. The gripers on the delivery apparatus then seize hold of the paper and carry it along until after its severance from the roll, and until just as the rear end is arrested and knocked down, when the gripers are made to release their hold and resume their position ready for the next sheet.

The cams for operating the gripers on the delivery apparatus are not shown in the drawings, they being no part of this invention; but they may be such as are used in the Bullock printing-press, or elsewhere.

Having hereinbefore explained how the web is conducted through the press with the aid of the two series of tapes upon their respective series of pulleys, I will now suggest that the same can be done without their aid. The end of the web in such case would require some guidance from the hand in the beginning of the operation, especially while passing around the second impression-cylinder from the second type-cylinder to the female cutting-cylinder; but after being seized hold of by the gripers in that cylinder, the web, being continuous and unbroken, is drawn through the press, the various convex surfaces of the cylinders over and under which it passes keeping it evenly spread until the tail end is reached.

The diameter of the male cutting-cylinder F being in the drawing one-fourth of that of the second impression-cylinder C, and one-half that of the female cutting-cylinder, the cut sheet will be one-half the circumference of the female cutting-cylinder E. Consequently, each set of gripers on the female cutting-cylinder is made to operate alternately; and the cams are so arranged that one set of gripers will deliver the forward end of the roll to the delivery apparatus R P, and the other set of gripers will deliver the forward end of the cut sheet to the delivery apparatus R′ P′.

It would be impracticable for one delivery apparatus of this kind to take charge of sheets following each other in uninterrupted succession without any space between the sheets of paper, as there would be no opportunity for the return of the knocker or fly rods from striking down the rear end of the sheet; and, for this reason, a second delivery apparatus, R′ P′, is added, which receives and disposes of each alternate sheet; and still, if the delivery apparatus R′ P′ were to run at the same speed as the delivery apparatus R P, the tail or rear end of the sheet delivered to the delivery apparatus R′ P′ would be in the way of the operation of the gripers on the delivery apparatus R P, to obviate which difficulty the gripers on the delivery apparatus R′ P′ are made to travel at an accelerated speed, which is done by increasing the diameters of its pulleys, which results in the endless bands upon which its gripers are mounted having an increased rate of speed, so that as soon as they close on the forward end of the cut sheet the sheet is slid rapidly along on the female cutting-cylinder E, leaving a space between the rear end of the cut sheet and the forward end of the roll for the operation of the gripers on the delivery apparatus R P.

When it is desired to slit the sheet of paper, a slot or rabbet is made around the circumference of the female cutting-cylinder E, into which a circular serrated blade is suspended or inserted, and, being suspended at its axis on an arm, $y''$, the serrated blade $v'''$ will revolve at the same speed as the paper simply by the passage of the paper itself, and thereby slit or perforate the paper, as described.

What I claim as my invention, and desire to secure by Letters Patent, is—

1. The combination of the first impression-cylinder B, the first type-cylinder D, the second type-cylinder D′, the second impression-cylinder C, and the female cutting-cylinder E, by which the paper is guided and conveyed, by the rolling contact of their convex surfaces, without the aid of tapes, belts, gripers, or bridges, from the supply-roll to the cutting-cylinders, substantially as described and set forth.

2. The combination of the two sets of pulleys $a^1$ $a^2$ $a^3$ $a^4$ $a^5$ and $b^1$ $b^2$ $b^3$ $b^4$ $b^5$, provided with their respective tapes, and the cylinders B, D, D′, C, and E, adapted to guide and convey the web from the supply-roll to the cutting-cylinders, substantially as described.

3. The first impression-cylinder B, in combination with spool $b^0$, mounted in its pivoted frame, and bearing the roll of paper in contact with the first impression-cylinder B, substantially as and for the purpose described.

4. The air-blast, in combination with the female cutting-cylinder E, provided with its interior pipes and their two series of openings or nozzles, by which the rear end of the sheet is blown out of the way of the gripers, substantially as shown and described.

5. The combination, with the female cutting-cylinder E, of the two delivery apparatuses P R and P′ R′, one moving with greater speed than the other, and so arranged, with respect to each other, as to deliver alternate sheets, substantially as described, for the purpose set forth.

6. The combination of the circular serrated knife $v'''$, mounted as shown and described, and the grooved female cutting-cylinder E, together adapted to split the sheets as fast as they are severed from the roll, the paper itself imparting motion to the knife, substantially as shown and described.

JOHN W. KELLBERG.

Witnesses:
JOHN H. SPACKMAN,
P. O'DONNELL.